US012530254B2

(12) United States Patent
Mali et al.

(10) Patent No.: US 12,530,254 B2
(45) Date of Patent: Jan. 20, 2026

(54) FAULT OVERRUN DETECTION FEATURE

(71) Applicant: Cypress Semiconductor Corporation, San Jose, CA (US)

(72) Inventors: Sumeet Mali, Dublin (IE); Kai Dieffenbach, Egelsbach (DE); Richard Landenbach, Langen (DE); Uwe Moslehner, Geiselbach (DE); Thiyagu Loganathan, Baldham (DE)

(73) Assignee: Cypress Semiconductor Corporation, San Jose, CA (US)

( * ) Notice: Subject to any disclaimer, the term of this patent is extended or adjusted under 35 U.S.C. 154(b) by 28 days.

(21) Appl. No.: 18/584,251

(22) Filed: Feb. 22, 2024

(65) Prior Publication Data

US 2025/0272180 A1    Aug. 28, 2025

(51) Int. Cl.
*G06F 11/00*    (2006.01)
*B60R 16/023*   (2006.01)
*G05B 23/02*    (2006.01)
*G06F 11/07*    (2006.01)

(52) U.S. Cl.
CPC ...... *G06F 11/0793* (2013.01); *B60R 16/0232* (2013.01); *G05B 23/0205* (2013.01); *G06F 11/0766* (2013.01)

(58) Field of Classification Search
CPC ............. G06F 11/0766; G06F 11/0793; G05B 23/0205; B60R 16/0232
See application file for complete search history.

(56) References Cited

U.S. PATENT DOCUMENTS

2016/0055032 A1\* 2/2016 David ................. G06F 11/0793
                                                          718/107
2023/0401112 A1\* 12/2023 Hofmann ............ G06F 11/0736

\* cited by examiner

*Primary Examiner* — Joshua P Lottich

(57) ABSTRACT

Techniques are disclosed for a fault monitor to determine that no fault has been lost. The fault monitor may distinguish between critical and non-critical faults without the risk of missing a critical fault. The fault monitor may detect a new fault event from a fault source and may set a fault overrun flag when the new fault event is detected while an existing fault event from the fault source is being processed. When the fault monitor receives a fault acknowledgement to indicate completion of processing of the existing fault event, the fault monitor may generate a request to process the new fault event as an overrun fault based on the fault overrun flag is set. The fault monitor may generate a request to process the new fault event as a non-overrun fault when the new fault event is detected without an existing fault event from the fault source being processed.

20 Claims, 8 Drawing Sheets

FAULT OVERRUN DETECTION FEATURE

TECHNICAL FIELD

This disclosure generally relates to electronic fault monitoring and specifically, to monitoring and reporting of critical and non-critical fault conditions for operational integrity, system security, or functional safety of components used in industrial, automobile, electronic, or other applications.

BACKGROUND

Fault monitoring and reporting plays an important role in many systems, such as in an automobile where sensors in various subsystems detect and report operational and safety information to a monitoring controller. The monitoring controller may evaluate the sensor intelligence to display functional status of the subsystems on the dashboard or may alert the driver to potential safety issues related to any critical or non-critical faults.

When a sensor reports a fault, there may be a time window for fault handling by the monitoring controller when any subsequent fault from the same sensor or same fault source may go unreported. When the monitoring controller is processing the fault reported from a sensor, it may assume that any further fault from the sensor may have been lost. If the first fault is a non-critical fault, the possibility exists that it masks a subsequent critical fault. As such, the monitoring controller cannot distinguish between non-critical and critical faults. When the monitoring controller determines that the first fault is a non-critical fault, it may nonetheless treat it as a critical fault for fear that a critical fault may be masked. So the monitoring controller may take extreme measure such as performing a system reset even for the non-critical fault. The result is that the reaction to the fault is not allowed to be based on the information reported by the sensor, reducing operational efficiency and compromising system performance. There is a need for a fault monitoring system to reliability determine that no fault is lost.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

A fault detection, reporting, and monitoring component of a system monitors various parts of the system for integrity, safety and other operational characteristics. Sensors attached to a subsystem may detect faults to report to a monitoring controller, such as a supervisory chip, information about the faults so the monitoring controller may take corrective actions. For example, a battery management system of an electric vehicle may continuously monitor voltages and temperatures reported by sensors of one or more battery cells to manage battery performance and to ensure functional safety of the battery. When a fault is reported by a sensor, the battery management system may process the fault to determine the type of corrective action to take as a function of the severity of the fault. In one embodiment, a fault may be classified as a non-critical fault warranting a less severe reaction, or a critical fault requiring more extreme reaction, such as performing a system reset.

Figure 1:
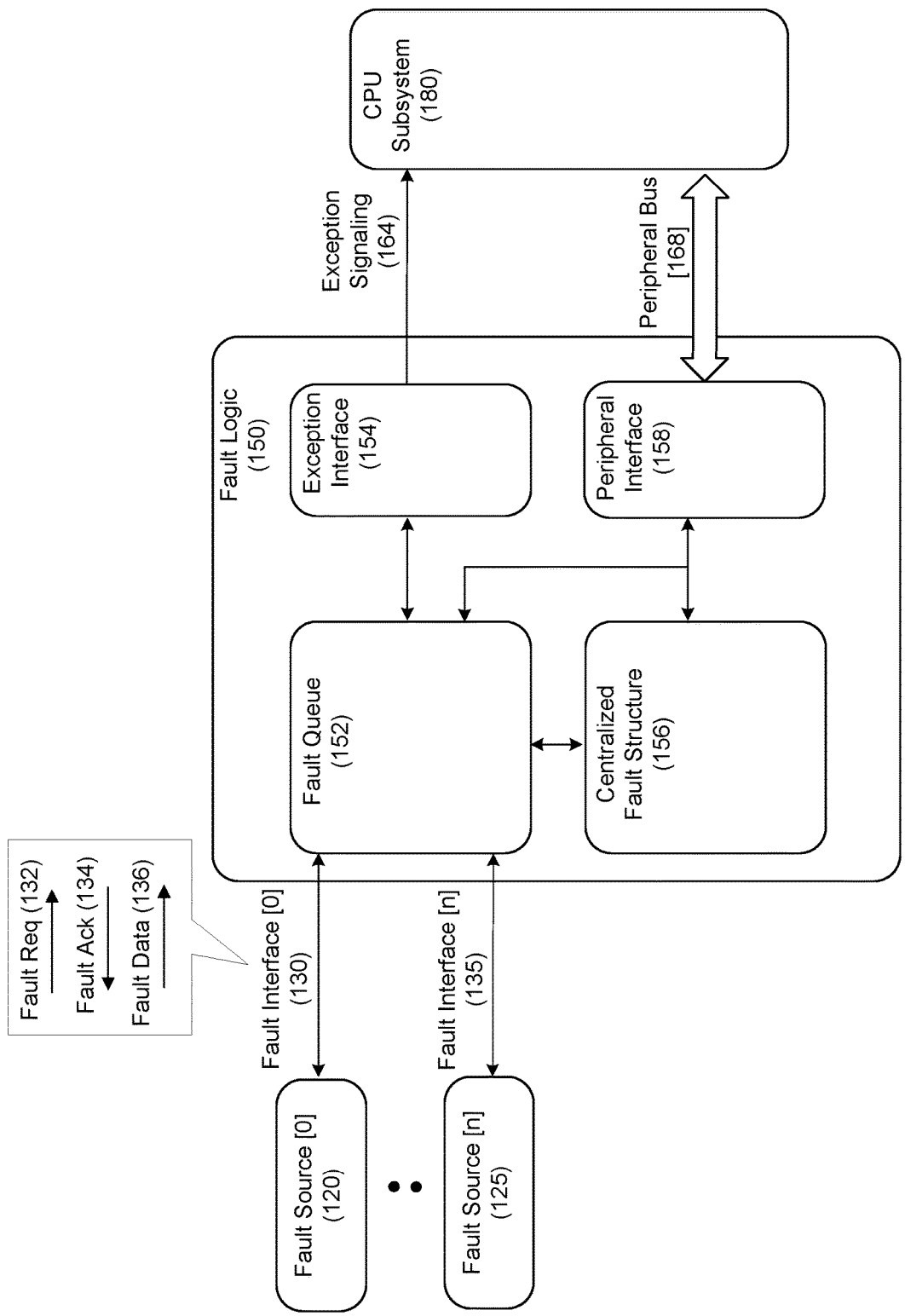
FIG. 1 illustrates a block diagram of a fault reporting and processing system in accordance with one aspect of the present disclosure.

FIG. 1 illustrates a block diagram 100 of a fault reporting and processing system in accordance with one aspect of the present disclosure. A fault logic component 150 may mediate between faults generated by one or more sensors such as fault sources [0 . . . n] (120 . . . 125) and a monitoring controller such as CPU subsystem 180. Fault logic component 150 may be implemented by a processor running software, a hardware sequencer, or a combination thereof.

Fault sources [0 . . . n] (120 . . . 125) may sense, measure, or perform other diagnostics of operating or safety characteristics of various components of a system being monitored to detect and report fault conditions to fault logic component 150 via their respective fault interface [0 . . . n] (130 . . . 135). In one embodiment, the fault interface for a fault source may include a fault request signal 132 to alert fault logic component 150 of a fault and fault data 136 that provides information or diagnostic data about the fault. Fault logic component 150 or CPU subsystem 180 may evaluate fault data 136 to determine if the associated fault request 132 is a critical or a non-critical fault so the system may respond accordingly. Fault logic component 150 may respond with a fault acknowledgement signal 134 on the fault interface to acknowledge the fault to the reporting fault source.

Fault logic component 150 may include a fault queue 152 that captures the faults reported by fault sources [0 . . . n] (120 . . . 125). Fault queue 152 may store reported information about each fault, the severity of the fault, status of the fault handling, etc., in a centralized fault structure 156. In one embodiment, fault queue 152 may determine a priority for handling the faults based on the data associated with each fault in the centralized fault structure 156. In one embodiment, fault queue 152 may process the faults instead of CPU subsystem 180. If a fault requires handling by CPU subsystem 180, fault queue 152 may invoke exception interface 154 to generate exception signaling 164. In one embodiment, exception signaling 164 may include an interrupt or a trigger signal requesting CPU subsystem 180 to process a fault. In one embodiment, CPU subsystem 180 may read fault data from one or more fault data status registers at the reporting fault source whose pending fault is being processed.

CPU subsystem 180 may communicate with fault logic component 150 through a peripheral bus 168. An exception handler of CPU subsystem 180 may access centralized fault structure 156 to obtain information about a fault through peripheral interface 158. The exception handler may update centralized fault structure 156 to provide status on the fault handling. Fault logic component 150 may provide status of processing of a pending fault by fault queue 152 or CPU subsystem 180 through fault acknowledgement signal 134 to the reporting fault source. In one embodiment, acknowledgement signal 134 may indicate that the pending fault is being processed. In one embodiment, acknowledgement signal 134 may indicate to the reporting fault source the completion of processing of the pending fault.

Figure 2:
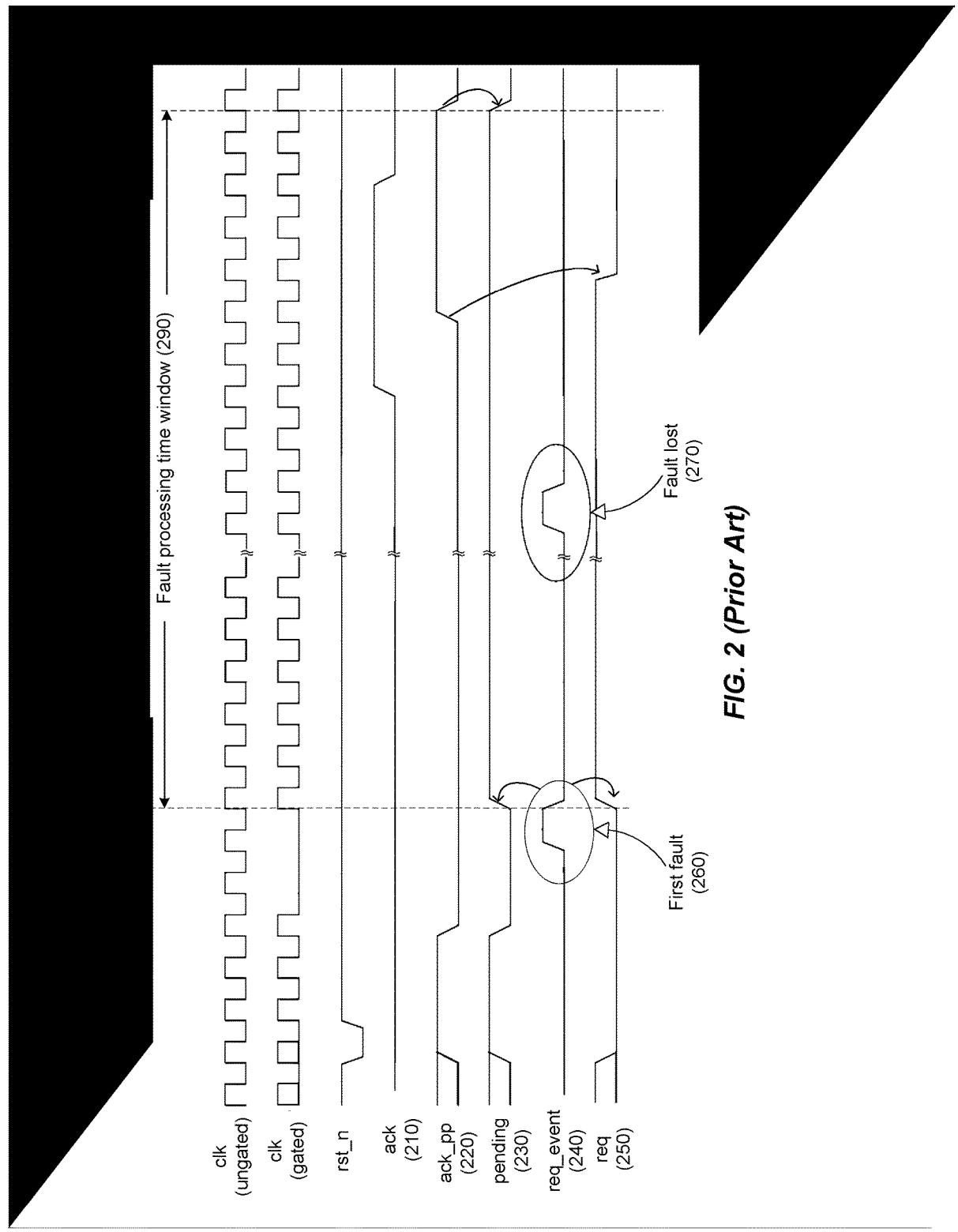
FIG. 2 illustrates a waveform of a first fault masking a subsequent fault from the same fault source during the fault processing time of the first fault in a conventional fault detection and reporting subsystem.

FIG. 2 illustrates a waveform 200 of a first fault masking a subsequent fault from the same fault source during the fault processing time of the first fault in a conventional fault detection and reporting subsystem.

A fault source may detect a fault condition to generate a first fault 260 on req_event signal 240. Based on the first fault 260, the fault source may assert a fault request (e.g., req signal 250). The fault source may transmit req signal 250 and fault data (not shown but may be fault data 136 of FIG. 1) containing information about the first fault 260 to a monitoring controller to request fault handling. The fault source may also assert an internal fault pending signal (e.g., pending signal 230) to indicate a pending fault.

The monitoring controller may receive req signal 250 and the fault data to evaluate the type of first fault 260 and to determine the corrective action to take. The monitoring controller may assert an acknowledgement signal (e.g., ack signal 210) to inform the fault source that req signal 250 has been received and that first fault 260 is being processed. The fault source may synchronize ack signal 210 received from the monitoring controller to generate an internal signal (ack_pp signal 220) that is used to de-assert req signal 250.

When the monitoring controller completes processing of first fault 260, the monitoring controller may de-assert ack signal 210, which in turn causes the fault source to de-assert pending signal 230. During the fault processing time window 290 when pending signal 230 is asserted to indicate fault processing of first fault 260, any subsequent fault from the fault source may be lost. For example, a second fault 270 on req_event signal 240 may be lost because the monitoring controller is still processing first fault 260. If first fault 260 is a non-critical fault and second fault 270 is a critical fault, the critical fault may be masked by the non-critical fault. To eliminate the risk of a lost critical fault, the monitoring controller may treat first fault 260 as a critical fault regardless of the actual type of fault (i.e., does not distinguish between a non-critical fault from a critical fault), thereby invoking measures that may be extreme (e.g., performing a system reset) for a non-critical fault and causing inefficiency in system operation.

Disclosed are systems and methods for a fault monitor to reliably determine that no fault has been lost. The fault monitor may distinguish between critical and non-critical faults without the risk of missing a critical fault, allowing for an appropriate fault response, ensuring integrity, security, and safety of a system.

Figure 3:
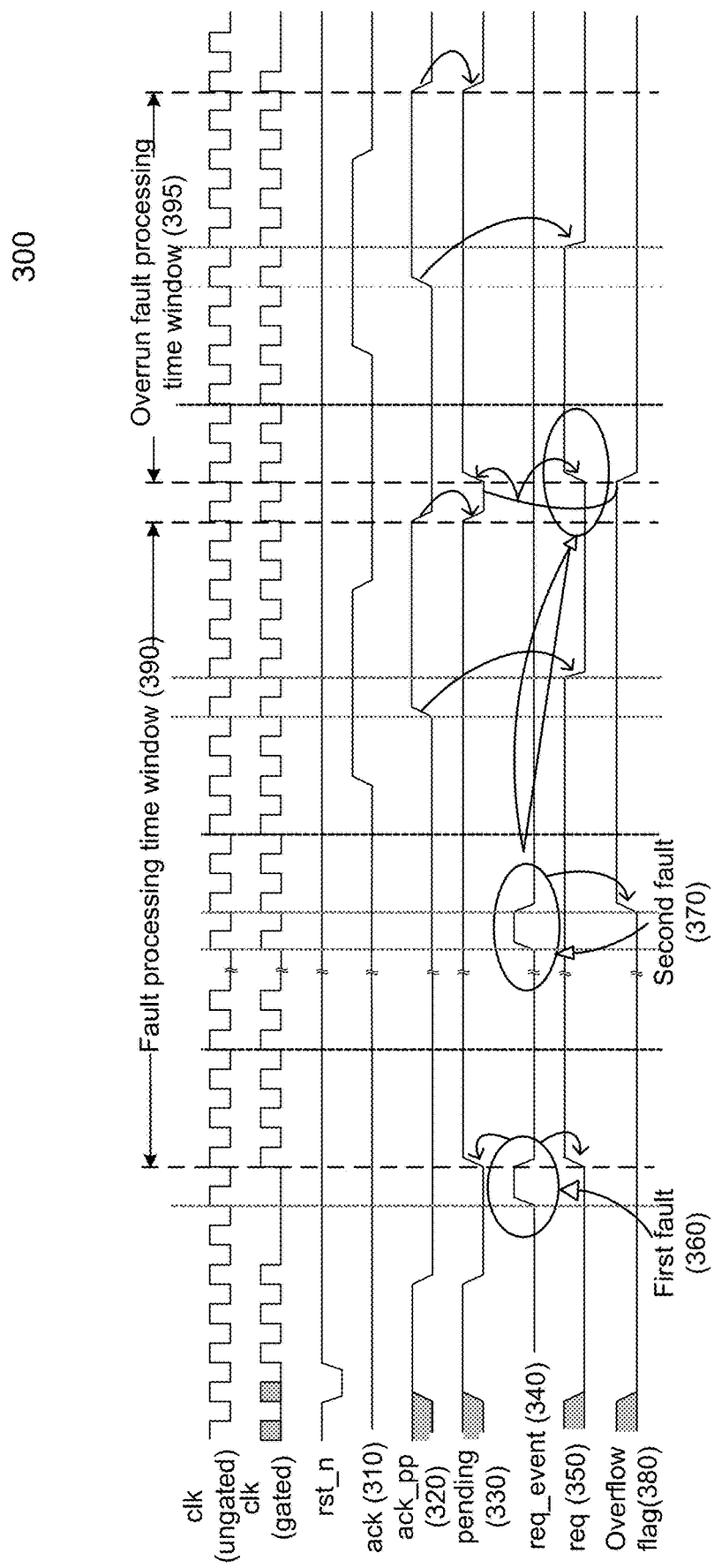
FIG. 3 illustrates a waveform of a mechanism for a fault detection and reporting subsystem to detect a subsequent fault during the fault processing time of a first fault and to report the subsequent fault after the completion of fault processing of the first fault according to an embodiment.

FIG. 3 illustrates a waveform 300 of a mechanism for a fault detection and reporting subsystem to detect a subsequent fault during the fault processing time of a first fault and to report the subsequent fault after the completion of fault processing of the first fault according to an embodiment. The fault detection and reporting subsystem may be implemented by fault sources [0 . . . n] (120 . . . 125) of FIG. 1.

A fault source may detect a fault condition to generate a first fault 360 on req_event signal 340. Based on the first fault 360, the fault source may assert a fault request (e.g., req signal 350) to request fault handling by a monitoring controller. In one embodiment, the fault source may assert fault request signal 132 of FIG. 1. In one embodiment, the fault source may capture information such as diagnostic data about first fault 360 and may transmit the captured information (not shown) via fault data 136 of FIG. 1. The fault source may also assert an internal fault pending signal (e.g., pending signal 330) to indicate a pending fault.

The monitoring controller may evaluate first fault 360 and any captured information associated with first fault 360 to determine the corrective action, if any, to take. For example, the monitoring controller may determine whether first fault 360 is a critical fault or a non-critical fault and may respond accordingly. The monitoring controller may assert an acknowledgement signal (e.g., ack signal 310) to inform the fault source that req signal 350 has been received and that first fault 360 is being processed. The fault source may synchronize ack signal 310 received from the monitoring controller to generate an internal signal (ack_pp signal 320) that is used to de-assert req signal 350.

When the monitoring controller receives the de-asserted req signal 350, the monitoring controller may de-assert ack signal 310, which in turn causes the fault source to de-assert pending signal 330. During the fault processing time window 390 when pending signal 330 is asserted, the fault source may detect a second fault event. The fault source may indicate a second fault 370 on req_event signal 340. Because pending signal 330 is asserted to indicate a pending fault, the fault source may assert an overflow flag 380 to indicate a fault overrun. In one embodiment, a flip-flop may set overflow flag 380 when a subsequent fault occurs while there is a pending fault from the same fault source.

The overflow flag 380 may remain asserted until pending signal 330 is de-asserted. Once pending signal 330 is de-asserted to indicate that first fault 360 is no longer pending, based on the asserted overflow flag 380, the fault source may re-assert req signal 350 to request fault handling of second fault 370 by the monitoring controller. The fault source may also re-assert pending signal 330 to indicate a new pending fault. The monitoring controller may process second fault 370 and may assert ack signal 310 to indicate fault handling of second fault 370. In response, the fault source may de-assert req signal 350.

When the monitoring controller receives the de-asserted req signal 350, the monitoring controller may de-assert ack signal 310, which in turn causes the fault source to de-assert pending signal 330. The overrun fault processing time window 395 shows the duration of fault processing of second fault 370 from the perspective of the fault source and may coincide with the second assertion of pending signal 330. If another fault occurs during overrun fault processing time window 395, overflow flag 380 may be asserted again. Upon the end of overrun fault processing time window 395, the fault source may re-assert req signal 350 to request fault processing of the additional fault by the monitoring controller.

Using overflow flag 380 to indicate a fault overrun condition when an earlier fault from the same fault source is being processed reduces the chances of a lost fault. When overflow flag 380 is not asserted and fault overrun is not reported, the monitoring controller may reliably know that no fault was lost. In the event there is more than one overrun fault occurring during fault processing of an earlier fault, overflow 380 may indicate only one fault overrun and any additional overrun faults do not get reported. However, the probability of multiple overrun faults occurring within the fault processing time window of a pending fault is very low. Even when multiple overrun faults do occur, there is no loss of relevant information because the first overrun fault will be treated as a critical fault to invoke a high level response that addresses any additional fault from the same fault source.

In one embodiment, to reduce hardware cost, the fault source may not capture the fault diagnostic information for the overrun fault during fault processing of the pending non-overrun fault. When requesting fault processing of the overrun fault, the fault source may provide the information to indicate to the monitoring controller that it is an overrun fault and that there is no additional fault diagnostic information associated with the overrun fault. For example, the fault data may define a few bits to indicate the fault type. The fault source may indicate on the fault type field that it is requesting fault processing of an overrun fault. In this case, the remaining bits of the fault data do not contain any information about the fault. The monitoring controller may presume that the overrun fault is a critical fault to take corrective action, which may be extreme if the overrun fault turns out to be a non-critical fault. However, because the probability of an overrun fault is low, such overreaction may be justified in exchange for a reduction in hardware and the resulting cost savings.

Figure 4:
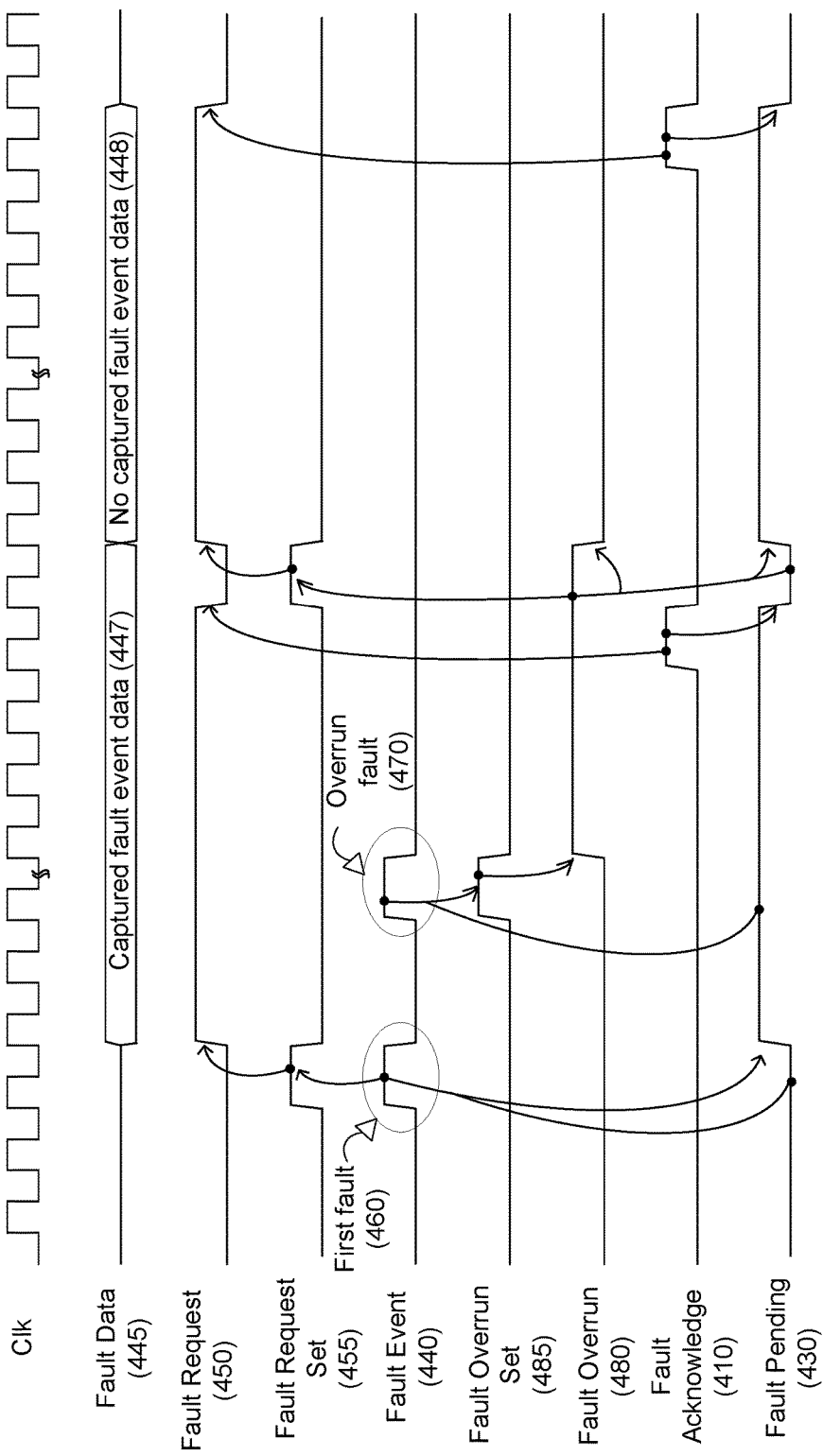
FIG. 4 illustrates another waveform of a mechanism for a fault detection and reporting subsystem to detect an overrun fault during the fault processing time of a first fault and to report the overrun fault after the completion of fault processing of the first fault according to an embodiment.

FIG. 4 illustrates another waveform 400 of a mechanism for a fault detection and reporting subsystem to detect an overrun fault during the fault processing time of a first fault and to report the overrun fault after the completion of the fault processing of the first fault.

A fault source may detect a fault condition to generate a first fault 460 on fault event signal 440. Based on the detection of first fault 460 and fault pending 430 signal in the de-asserted state, the fault source may generate fault request set signal 455 to assert fault request 450 to request fault handling by a monitoring controller. In one embodiment, fault request 450 may be the fault request signal 132 of FIG. 1. The fault source may capture information such as diagnostic data associated with first fault 460 and may transmit captured fault event data 447 on fault data bus 445. In one embodiment, fault data bus 445 may be the fault data signal 136 of FIG. 1. The fault source may assert fault pending signal 430 to indicate a pending fault.

Upon receiving fault request 450, the monitoring controller may evaluate captured fault event data 447 to determine a type of fault for first fault 460, such as whether it's a critical fault or a non-critical fault. The monitoring controller may take the appropriate corrective action in response to the type of fault found. When the monitoring controller completes processing first fault 460, the monitoring controller may assert fault acknowledge 410, which in turn causes the fault source to de-assert fault request 450 and fault pending signal 430. In one embodiment, fault acknowledge 410 may be the fault acknowledge signal 134 of FIG. 1.

During the time when fault pending 430 is asserted to indicate that the monitoring controller is processing first fault 460, the fault source may detect another fault condition to generate a second fault, referred to as overrun fault 470, on fault event signal 440. Because fault pending signal 430 is in the asserted state when overrun fault 470 occurs, the fault source may generate fault overrun set signal 485 to assert fault overrun flag 480. The fault source may not capture information associated with overrun fault 470 because the fault source may maintain only enough resources to store fault information associated with only one pending fault and the monitoring controller is still processing captured fault event data 447 of first fault 460.

When fault pending signal 430 becomes de-asserted to indicate that first fault 460 is no longer pending, because fault overrun flag 480 is set, the fault source may generate fault request set signal 455 to re-assert fault request 450 to request fault handling of overrun fault 470 by the monitoring controller. The fault source may re-assert fault pending signal 430 and de-assert fault overrun signal 480. The fault source may indicate on fault data bus 445 that the fault is overrun fault 470 and that there is no captured fault event data 448 associated with overrun fault 470. In one embodiment, the fault source may reserve a bit on fault data bus 445 not used by validly captured fault event data to indicate overrun fault 470 and that no fault information is provided.

Upon receiving fault request 450 to process overrun fault 470, the monitoring controller may observe that no captured fault event data 448 is provided on fault data bus 445. Without the information to determine the fault type of overrun fault 470, the monitoring controller may presume that overrun fault 470 is a critical fault. However, because the probability of an overrun fault is low, the penalty in operational efficiency due to an overreaction is minimal. While the monitoring controller may operate in a pessimistic manner when processing overrun fault 470, in contrast to a conventional system that does not use a fault overrun flag, the monitoring controller of FIG. 4 may distinguish between critical and non-critical fault for first fault 460 without the risk of missing an overrun fault that is a critical fault. As a result, the number of system resets as an overreaction to non-critical faults is significantly reduced, improving system dependability and integrity.

When the monitoring controller completes processing overrun fault 470, the monitoring controller may assert fault acknowledge 410, which in turn causes the fault source to de-assert fault request 450 and fault pending signal 430.

Figure 5:
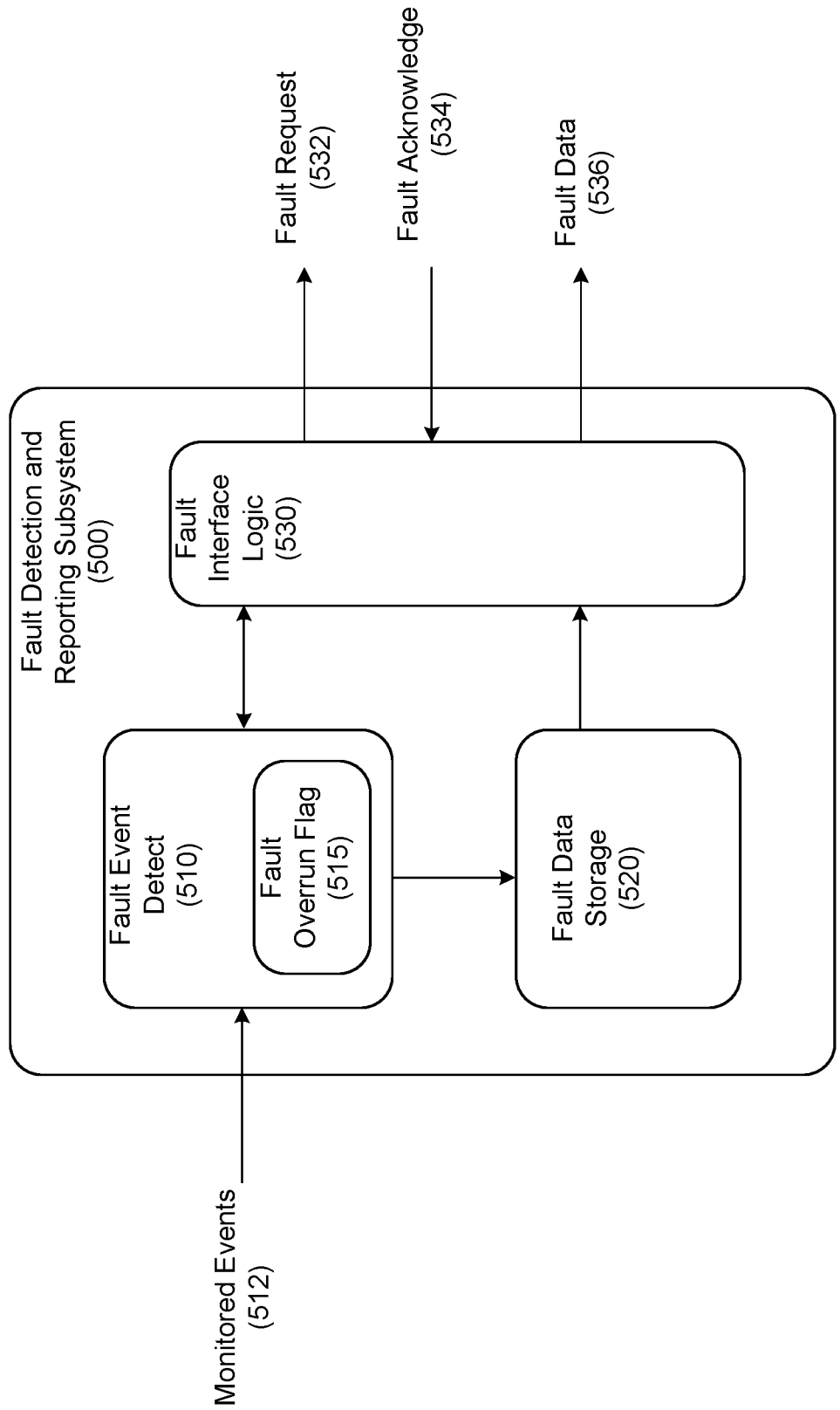
FIG. 5 illustrates a block diagram of a fault detection and reporting subsystem that detects an overrun fault during the fault processing time of a first fault and reports the overrun fault after the completion of fault processing of the first fault according to an embodiment.

FIG. 5 illustrates a block diagram of a fault detection and reporting subsystem 500 that detects an overrun fault during the fault processing time of a first fault and reports the overrun fault after the completion of fault processing of the first fault according to an embodiment. Fault detection and reporting subsystem 500 may be implemented by a processor running software, a hardware sequencer, or a combination thereof.

A fault event detect component 510 may receive monitored events 512 from one or more sensors to detect a fault condition. For example, fault detection and reporting subsystem 500 may be a battery management subsystem of an electric vehicle that continuously monitors voltages, currents, temperatures, and other operating characteristics of an array of battery cells. When one of the monitored conditions falls outside of a desired operating range, fault event detect component 510 may detect a fault event. In one embodiment, fault event detect component 510 may determine if there is a malfunction in the battery monitoring system that may affect the integrity of the monitored information (e.g., a few flipped bits in an SRAM word).

Fault event detect component 510 may generate a fault request signal 532 to a monitoring controller or a supervisory processor through a fault interface logic 530 to request processing of the fault event. Diagnostic information associated with the fault event such as sensor data may be captured and stored in fault data storage 520. When generating fault request signal 532, fault event detect component 510 may place the captured information associated with the fault on fault data line 536. Fault event detect component 510 may assert an internal fault pending signal (not shown) to indicate the pending fault.

When a subsequent fault event is detected while there is an existing pending fault, fault event detect component 510 may set a fault overrun flag 515. In one embodiment, fault event detect 510 may set fault overrun flag 515 when the overrun fault occurs while the fault pending signal is asserted. In one embodiment, fault data storage 520 may not capture the diagnostic information associated with the overrun fault if it has the capacity to store diagnostic information associated with only one pending fault. In one embodiment, fault data storage 520 may be 64 bits deep to store the diagnostic information for one fault source.

When the monitoring controller acknowledge processing of the pending fault, it may assert fault acknowledge signal 534, causing fault event detect component 510 to reset fault request signal 532 and the fault pending signal. If fault overrun flag 515 is set, fault event detect component 510 may re-assert fault request signal 532 to request processing of the overrun fault as well as re-asserting the fault pending signal. The monitoring controller may process the overrun fault without the diagnostic information associated with the overrun fault, such as by presuming that the overrun fault is a critical fault. When the monitoring controller completes processing of the overrun fault, it may assert fault acknowledge signal 534 to reset fault request 532 and the fault pending signal. In one embodiment, fault request 532, fault acknowledgement signal 534, and fault data line 536 may be the fault request signal 132, fault acknowledgement signal 134, and fault data 136 of FIG. 1.

Figure 6:
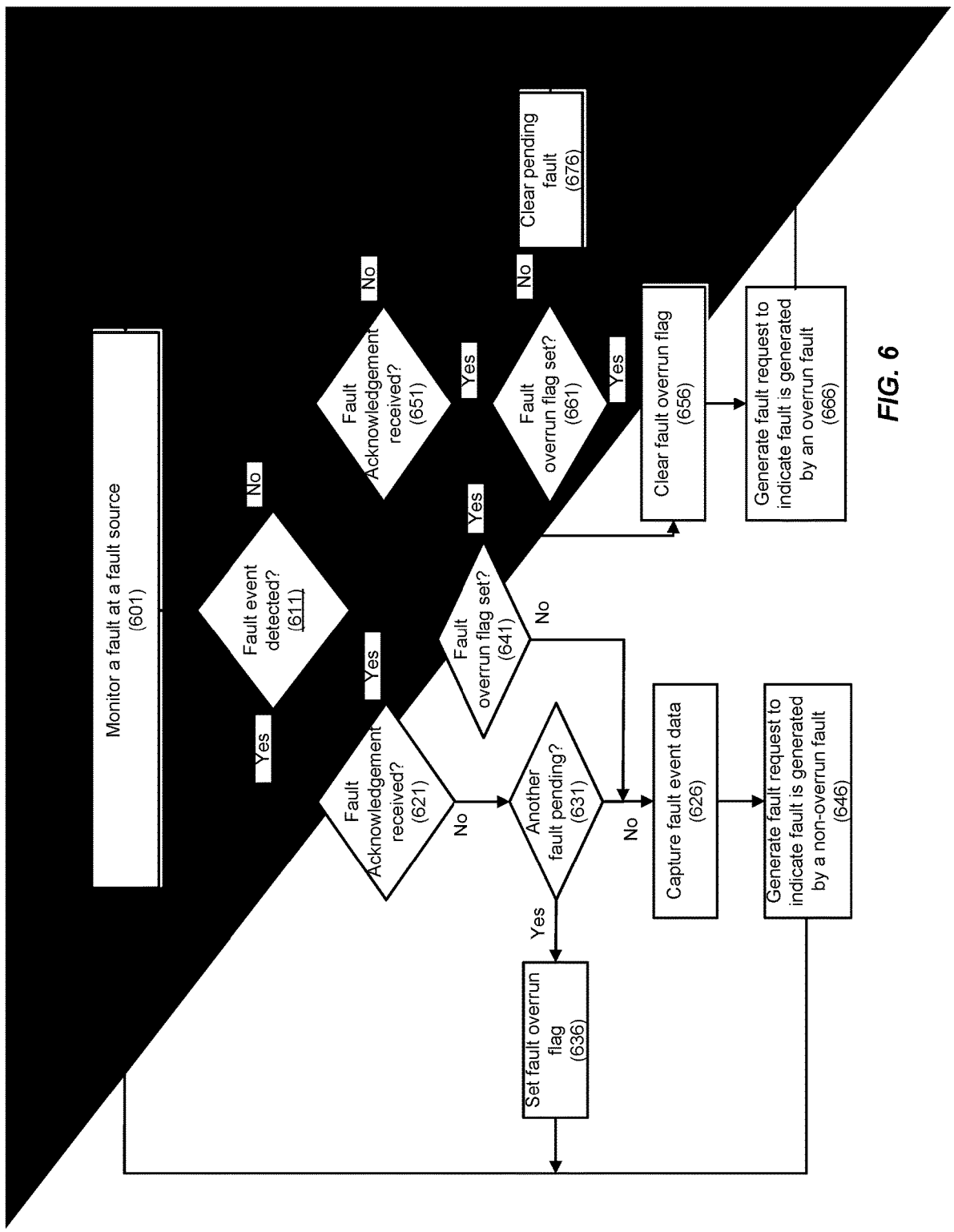
FIG. 6 is a flow diagram illustrating a method for a fault detection and reporting subsystem to detect an overrun fault during the fault processing time of a first fault and to report the overrun fault after the completion of fault processing of the first fault according to an embodiment.

FIG. 6 is a flow diagram illustrating a method 600 for a fault detection and reporting subsystem to detect an overrun fault during the fault processing time of a first fault and to report the overrun fault after the completion of fault processing of the first fault according to an embodiment. Method 600 may be performed by fault source [0 . . . n] (120 . . . 125) of FIG. 1 or fault detection and reporting subsystem 500 of FIG. 5.

In operation 601, the fault detection and reporting subsystem monitors conditions at a component of a system to detect a fault event. In one embodiment, a fault event may occur when functional characteristics of the component fall outside of a desired operating range or if there is a malfunction in the component that may affect the integrity of the monitored functional characteristics.

In operation 611, the fault detection and reporting subsystem determines if a fault event has been detected. If a fault event is detected, the fault detection and reporting subsystem determines if a fault acknowledgement signal is received from a supervisory processor charged with processing a pending fault in operation 621. A fault acknowledgement signal may be received simultaneously with the detection of a fault event in a first boundary condition when a second fault event occurs simultaneously with the supervisory processor completing processing a pending first fault event.

If operation 621 determines that a fault acknowledgement signal is received with a detected fault event, the fault detection and reporting subsystem determines if a fault overrun flag is set in operation 641. Operation 641 checks for a second boundary condition where a third fault event occurs simultaneously with the supervisory processor completing processing of a pending first fault event while the fault overrun flag indicates a second fault event (e.g., an overrun fault) is waiting for processing. This boundary condition may be very rare, but nonetheless is accounted for.

If operation 641 determines that this second boundary condition occurs, the detected fault event (e.g., third fault event in the above example) is ignored in favor of the overrun fault. In operation 656, the fault detection and reporting subsystem clears the fault overrun flag. In operation 666, the fault detection and reporting subsystem generates a fault request to the supervisory processor to request processing of the overrun fault. In one embodiment, the fault detection and reporting subsystem may indicate that the fault request is for an overrun fault by transmitting a fault information pattern not associated with a non-overrun fault on a fault data bus.

If operation 641 determines that the fault overrun flag is not set when a fault acknowledgement signal is received with a detected fault event, the fault detection and reporting subsystem captures information associated with the detected fault event (e.g., second fault event) in operation 626 because the first fault event has been processed. In operation 646, the fault detection and reporting subsystem generates a fault request to the supervisory processor to request processing of the detected fault event as a non-overrun fault. In one embodiment, the fault detection and reporting subsystem may indicate that the fault request is for a non-overrun fault by transmitting a valid fault information pattern associated with a non-overrun fault on the fault data bus. The fault detection and reporting subsystem returns to operation 601 to monitor conditions to detect additional fault events.

If operation 621 determines that an acknowledgement signal is not received with the detection of a fault event, the fault detection and reporting subsystem determines if the supervisory processor is processing a pending fault event in operation 631. Operation 631 checks for the overrun fault condition when the detected fault event is an overrun fault while the supervisory processor has not completed processing a pending first fault event.

If operation 631 determines that there is an overrun fault condition, the fault detection and reporting subsystem sets the fault overrun flag in operation 636. The fault overrun flag enables the fault detection and reporting subsystem to generate a fault request to the supervisory processor to request processing of the overrun fault once the supervisory processor completes processing the pending first fault event. In one embodiment, the fault detection and reporting subsystem does not capture information associated with the overrun fault to save the hardware cost of storing two sets of fault information (e.g., one set for the pending first fault event and a separate set for the overrun fault). The fault detection and reporting subsystem returns to operation 601 to monitor conditions to detect additional fault events.

If operation 631 determines that there is no overrun fault condition when a fault event is detected, the fault detection and reporting subsystem captures information associated with the detected fault event (e.g., a non-overrun fault) in operation 626. In operation 646, the fault detection and reporting subsystem generates a fault request to the supervisory processor to request processing of the detected fault event as a non-overrun fault. The fault detection and reporting subsystem returns to operation 601 to monitor conditions to detect additional fault events.

If operation 611 determines a fault event is not detected, the fault detection and reporting subsystem determines if a fault acknowledgement signal is received in operation 651. A fault acknowledgement signal may be received from a supervisory controller when the supervisory controller completes processing a pending fault event. If a fault acknowledgement signal is not received, the fault detection and reporting subsystem return to operation 601 to monitor conditions to detect additional fault events.

If operation 651 determines that a fault acknowledgement signal is received, the fault detection and reporting subsystem determines if a fault overrun flag is set in operation 661. Operation 661 checks if an overrun fault is waiting for processing.

If operation 661 determines that the fault overrun flag is not set, the fault detection and reporting subsystem clears the pending fault event (e.g., clears the fault request) to indicate that the pending fault event has been processed in operation 676. The fault detection and reporting subsystem returns to operation 601 to monitor conditions to detect additional fault events.

If operation 661 determines that the fault overrun flag is set, the fault detection and reporting subsystem clears the fault overrun flag in operation 656. In operation 666, the fault detection and reporting subsystem generates a fault request to the supervisory processor to request processing of the overrun fault. In one embodiment, the fault detection and reporting subsystem may indicate that the fault request is for an overrun fault by transmitting a fault information pattern not associated with a non-overrun fault on a fault data bus. The fault detection and reporting subsystem returns to operation 601 to monitor conditions to detect additional fault events.

Figure 7:
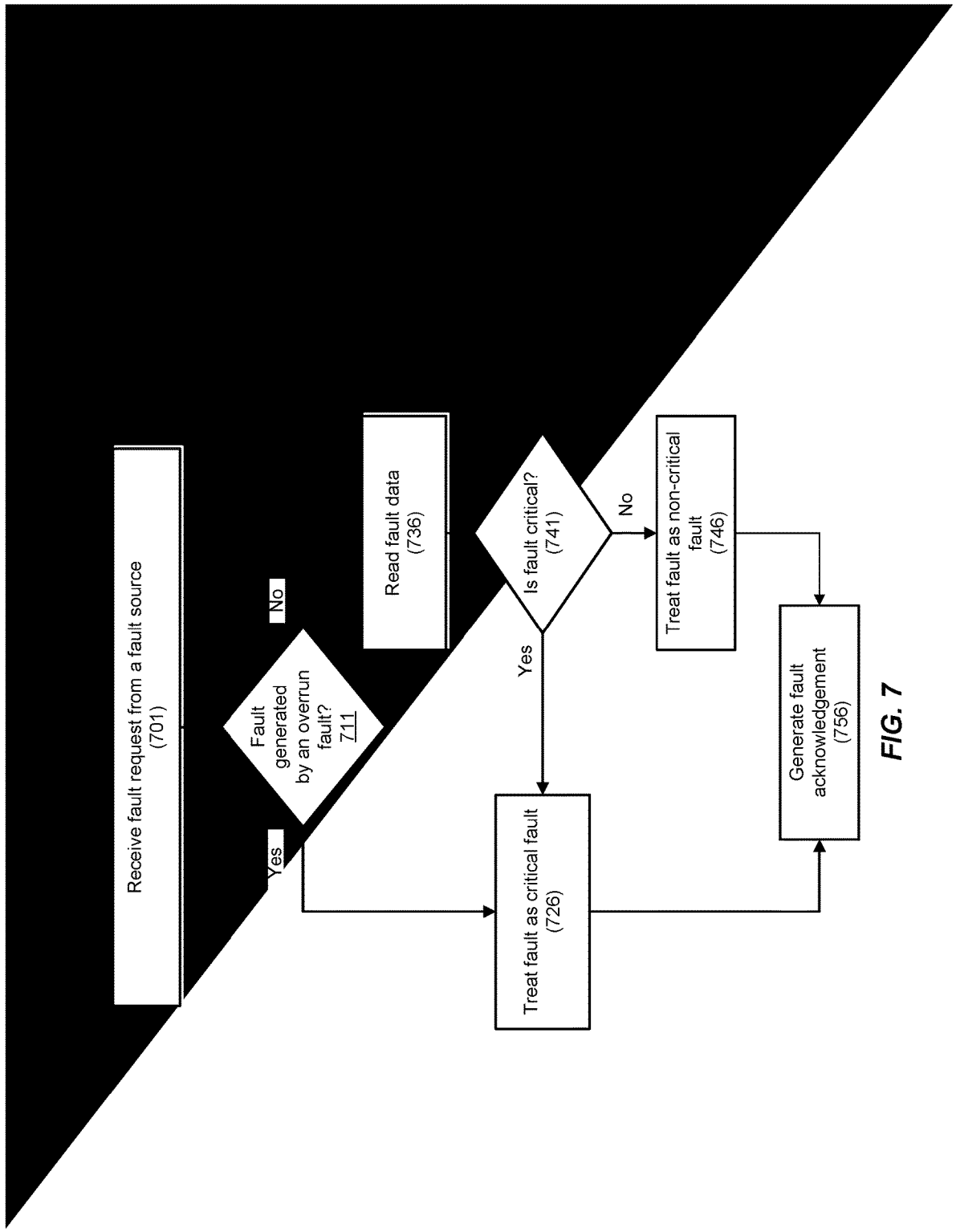
FIG. 7 is a flow diagram illustrating a method for a monitoring controller that processes faults from a fault detection and reporting subsystem to distinguish between a critical fault and a non-critical fault according to an embodiment.

FIG. 7 is a flow diagram illustrating a method 700 for a monitoring controller that processes faults from a fault detection and reporting subsystem to distinguish between a critical fault and a non-critical fault according to an embodiment. Method 700 may be performed by fault logic component 150 or CPU subsystem 180 of FIG. 1.

In operation 701, the monitoring controller receives a fault request from a fault source requesting processing of a fault event. The fault source may generate the fault request when functional characteristics of a component being monitored fall outside of a desired operating range or if there is a malfunction in a component that may affect the integrity of the monitored functional characteristics. The fault request may be accompanied by diagnostic information associated with the fault event. The monitoring controller may evaluate the diagnostic information to determine the type of fault for the fault event. In one embodiment, the type of fault may be critical or non-critical faults that demand different corrective measures.

In operation 711, the monitoring controller determines if the fault event is generated by an overrun fault. An overrun fault condition occurs when a second fault (e.g., an overrun fault) occurs while the monitoring controller is processing a first fault from the same fault source. The fault source may save the overrun fault until the monitoring controller completes processing the first fault. Upon the monitoring controller completing processing the first fault, the monitoring controller may receive the fault request requesting processing of the overrun fault. In one embodiment, the monitoring controller may determine if the fault event is generated by an overrun fault by determining that no diagnostic information is associated with the fault event. In one embodiment, the monitoring controller may determine that no diagnostic information accompanies the fault event when the diagnostic information has a data pattern not associated with a non-overrun fault.

If operation 711 determines that the fault event is generated by an overrun fault, the monitoring controller presumes the fault event is a critical fault in operation 726 because there are no diagnostic information associated with the overrun fault to allow the monitoring controller to ascertain whether the overrun fault is a critical or a non-critical fault. Without the diagnostic information, the monitoring controller chooses to treat the overrun fault in a pessimistic manner.

In operation 756, the monitoring controller completes processing the overrun fault to generate a fault acknowledgement signal. In one embodiment, the monitoring controller may take corrective action in response to the critical fault by resetting the system being monitored. In one embodiment, the monitoring controller transmits the fault acknowledgement signal to the fault source to clear the fault request.

If operation 711 determines that the fault event is generated by a non-overrun fault, the monitoring controller evaluates the diagnostic information associated with the non-overrun fault to determine the type of fault in operation 736.

In operation 741, the monitoring controller determines whether the non-overrun fault is a critical fault or a non-critical fault based on the diagnostic information. If the non-overrun fault is a critical fault, the monitoring controller processes the critical fault in operation 726 and upon completing processing the critical non-overrun fault, generates the fault acknowledgement signal in operation 756.

If operation 741 determines the non-overrun fault is a non-critical fault, the monitoring controller processes the non-critical fault in operation 746 and upon completing processing the non-critical non-overrun fault, generates the fault acknowledgement signal in operation 756. In one embodiment, the monitoring controller may ignore the non-critical fault or take corrective action that is less severe than that for a critical fault.

Figure 8:
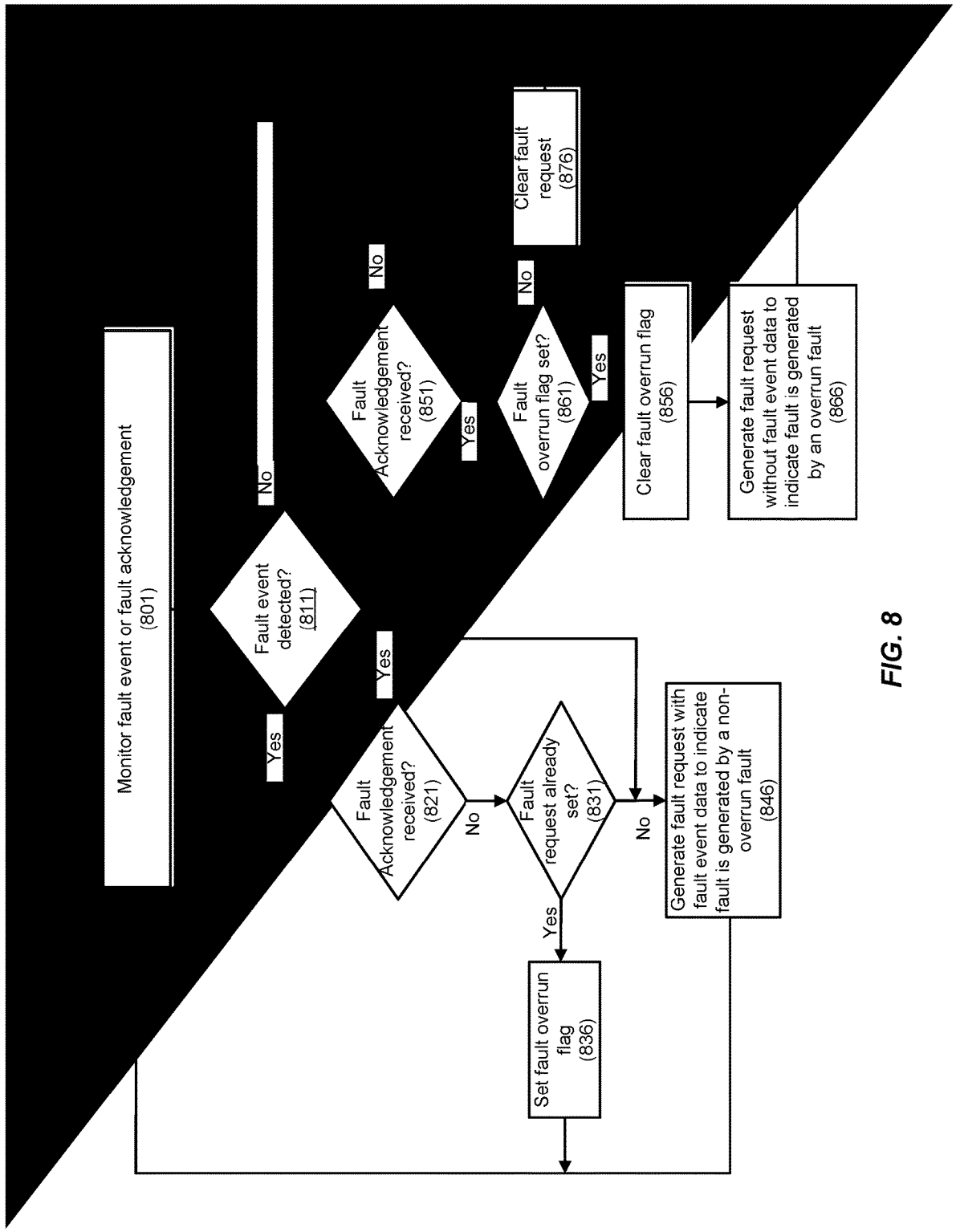
FIG. 8 is a flow diagram illustrating a method for a fault detection and reporting subsystem to detect an overrun or a non-overrun fault and to report the type of fault when requesting processing of the fault according to an embodiment.

FIG. 8 is a flow diagram illustrating a method 800 for a fault detection and reporting subsystem to detect an overrun or a non-overrun fault and to report the type of fault when requesting processing of the fault according to an embodiment. Method 600 may be performed by fault source [0 . . . n] (120 . . . 125) of FIG. 1 or fault detection and reporting subsystem 500 of FIG. 5.

In operation 801, the fault detection and reporting subsystem monitors a fault event or a fault acknowledgement signal. In one embodiment, a fault event may occur when functional characteristics of a component being monitored fall outside of a desired operating range or if there is a malfunction in a component that may affect the integrity of the monitored functional characteristics. In one embodiment, a fault acknowledgement signal is received from a supervisory processor charged with processing a pending fault when the supervisory processor completes processing a pending fault event. In one embodiment, a fault acknowledgement signal is received from the supervisory processor to indicate the supervisory processor is processing a pending fault event. When the supervisory processor completes processing the pending fault event, the supervisory processor may clear the fault acknowledgement signal. In this scenario, references in method 800 to receiving a fault acknowledgement signal denotes receiving an indication that the fault acknowledgement signal has been cleared.

In operation 811, the fault detection and reporting subsystem determines if a fault event has been detected. If a fault event is detected, the fault detection and reporting subsystem determines if a fault acknowledgement signal is received from the supervisory processor in operation 821. A fault acknowledgement signal may be received simultaneously with the detection of a fault event when a second fault event occurs simultaneously with the supervisory processor completing processing a pending first fault event.

If operation 821 determines that a fault acknowledgement signal is received with a detected fault event, the fault detection and reporting subsystem generates a fault request with fault event data to the supervisory processor to request processing of the detected fault event as a non-overrun fault in operation 846 because the supervisory processor has completed processing the pending first fault event. In one embodiment, the fault event data may allow the monitoring controller to determine whether the non-overrun fault is a critical or a non-critical fault. The fault detection and reporting subsystem returns to operation 801 to wait for additional fault events or for the fault acknowledgement when the supervisory processor completes processing the non-overrun fault.

If operation 821 determines that a fault acknowledgement signal is not received with a detected fault event, the fault detection and reporting subsystem determines if a fault request is already set in operation 831. Operation 831 checks for the overrun fault condition when the detected fault event is an overrun fault when the supervisory processor has not completed processing a pending first fault event.

If operation 831 determines there is an overrun fault condition, the fault detection and reporting subsystem sets the fault overrun flag in operation 836. The fault overrun flag enables the fault detection and reporting subsystem to generate a fault request to the supervisory processor to request processing of the overrun fault once the supervisory processor completes processing the pending first fault event. In one embodiment, the fault detection and reporting subsystem does not capture information associated with the overrun fault to save the hardware cost of storing two sets of fault information (e.g., one set for the pending first fault event and a separate set for the overrun fault). The fault detection and reporting subsystem returns to operation 801 to wait for the fault acknowledgement signal when the supervisory processor completes processing the pending first fault event.

If operation 831 determines that there is no overrun fault condition when a fault event is detected, the fault detection and reporting subsystem generates a fault request with fault event data to the supervisory processor to request processing of the detected fault event as a non-overrun fault in operation 846. The fault detection and reporting subsystem returns to operation 801 to wait for additional fault events or for the fault acknowledgement when the supervisory processor completes processing the non-overrun fault.

If operation 811 determines a fault event is not detected, the fault detection and reporting subsystem determines if a fault acknowledgement signal is received in operation 851. If a fault acknowledgement signal is not received, the fault detection and reporting subsystem returns to operation 801 to wait for a fault event or for the fault acknowledgement signal. Otherwise, if a fault acknowledgement signal is received, the fault detection and reporting subsystem determines if a fault overrun flag is set in operation 861. Operation 861 checks if an overrun fault is waiting for processing.

If operation 861 determines that the fault overrun flag is not set, the fault detection and reporting subsystem clears the fault request to indicate that the pending fault event has been processed in operation 876. The fault detection and reporting subsystem returns to operation 801 to wait for an additional fault event.

If operation 861 determines that the fault overrun flag is set, the fault detection and reporting subsystem clears the fault overrun flag in operation 856. In operation 866, the fault detection and reporting subsystem generates a fault request without fault event data to the supervisory processor to request processing of the overrun fault. In one embodiment, the fault detection and reporting subsystem may indicate that the fault request is for an overrun fault by transmitting a data pattern for the fault event data that is not associated with a non-overrun fault. The fault detection and reporting subsystem returns to operation 801 to wait for additional fault events or for the fault acknowledgement signal when the supervisory processor completes processing the overrun fault.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of fault reporting, comprising:
   detecting a new fault event from a fault source;
   setting a fault overrun flag when the new fault event is detected while an existing fault event from the fault source is being processed;
   receiving a fault acknowledgement to indicate completion of processing of the existing fault event; and
   generating a request to process the new fault event as an overrun fault based on the fault overrun flag being set.

2. The method of claim 1, further comprising:
   transmitting the request to process the new fault event as an overrun fault to a processing unit that processes the existing fault event.

3. The method of claim 2, wherein transmitting the request comprises:
   transmitting the request with an indication that the new fault event comprises an overrun fault but without additional information associated with the new fault event.

4. The method of claim 3, wherein the processing unit is configured to classify the overrun fault as a critical fault based on a predefined rule set stored in memory.

5. The method of claim 1, further comprising:
   generating a request to process the new fault event as a non-overrun fault when the new fault event is detected without an existing fault event from the fault source being processed.

6. The method of claim 5, wherein generating the request to process the new fault event as a non-overrun fault comprises:
   capturing information associated with the new fault event; and
   transmitting the information captured with the request to a processing unit to indicate that the new fault event comprises a non-overrun fault.

7. The method of claim 6, wherein the information comprises predefined diagnostic data fields, and whether the processing unit classifies the new fault event as a critical fault or a non-critical fault based on a comparison of the diagnostic data to one or more threshold values stored in memory.

8. The method of claim 1, further comprising:
   clearing a fault request associated with the existing fault when the fault acknowledgement for the existing fault is received.

9. The method of claim 1, wherein generating the request to process the new fault event as an overrun fault comprises:
   clearing the fault overrun flag.

10. The method of claim 1, further comprising:
    generating a request to process the new fault event as a non-overrun fault when detecting the new fault event while receiving the fault acknowledgement to indicate completion of processing of the existing fault event.

11. An apparatus comprising:
    a processing unit configured to perform operations, the operations comprising:
      detect a new fault from a fault source;
      set a fault overrun flag when the new fault event is detected while an existing fault event from the fault source is being processed;
      receive a fault acknowledgement to indicate completion of processing of the existing fault event; and
      generate a request to process the new fault event as an overrun fault based on the fault overrun flag being set.

12. The apparatus of claim 11, wherein the processing unit is further configured to perform operations comprising:
    transmit the request to process the new fault event as an overrun fault to a second processing unit that processes the existing fault.

13. The apparatus of claim 12, wherein to transmit the request, the processing unit is further configured to perform operations comprising:

transmit the request with an indication that the new fault event comprises an overrun fault but without additional information associated with the new fault event.

14. The apparatus of claim 13, wherein the second processing unit is configured to classify the overrun fault as a critical fault based on a predefined rule set stored in memory.

15. The apparatus of claim 11, wherein the processing unit is further configured to perform operations comprising:
generate a request to process the new fault event as a non-overrun fault when the new fault event is detected without an existing fault event from the fault source being processed.

16. The method of claim 15, wherein to generate the request to process the new fault event as a non-overrun fault, the processing unit is configured to perform operations comprising:
capture information associated with the new fault event; and
transmit the information captured with the request to a second processing unit to indicate that the new fault event comprises a non-overrun fault.

17. The apparatus of claim 16, wherein the information comprises predefined diagnostic data fields, and whether the processing unit classifies the new fault event as a critical fault or a non-critical fault based on a comparison of the diagnostic data to one or more threshold values stored in memory.

18. The apparatus of claim 11, wherein the processing unit is further configured to perform operations comprising:
clear a fault request associated with the existing fault when the fault acknowledgement for the existing fault is received.

19. The apparatus of claim 11, wherein to generate the request to process new fault event as an overrun fault, the processing unit is further configured to perform operations comprising:
clear the fault overrun flag.

20. The apparatus of claim 11, wherein the processing unit is further configured to perform operations comprising:
generate a request to process the new fault event as a non-overrun fault when the new fault event is detected while the fault acknowledgement to indicate completion of processing of the existing fault event is received.

* * * * *